(12) United States Patent
Chen et al.

(10) Patent No.: US 9,415,547 B2
(45) Date of Patent: Aug. 16, 2016

(54) THREE-DIMENSIONAL PRINTING APPARATUS

(71) Applicants:XYZprinting, Inc., New Taipei (TW); Kinpo Electronics, Inc., New Taipei (TW); Cal-Comp Electronics & Communications Company Limited, New Taipei (TW)

(72) Inventors: Peng-Yang Chen, New Taipei (TW); Wen-Ten Lin, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 294 days.

(21) Appl. No.: 14/322,917

(22) Filed: Jul. 3, 2014

(65) Prior Publication Data

US 2015/0306825 A1    Oct. 29, 2015

(30) Foreign Application Priority Data

Apr. 29, 2014 (TW) .............................. 103115345 A

(51) Int. Cl.
| B29C 67/00 | (2006.01) |
| B29C 35/08 | (2006.01) |
| B33Y 10/00 | (2015.01) |
| B33Y 50/02 | (2015.01) |

(52) U.S. Cl.
CPC ......... *B29C 67/0088* (2013.01); *B29C 67/0062* (2013.01); *B33Y 10/00* (2014.12); *B33Y 50/02* (2014.12)

(58) Field of Classification Search
CPC ........................ B29C 67/0055; B29C 67/0088
USPC ........................................................ 425/375
See application file for complete search history.

(56) References Cited

U.S. PATENT DOCUMENTS

| 8,003,040 | B2* | 8/2011 | El-Siblani | ............. B29C 67/007 264/401 |
| 8,348,655 | B2* | 1/2013 | Kuzusako | ........... B29C 67/0055 264/401 |
| 8,880,209 | B2* | 11/2014 | Yasukochi | .......... B29C 67/0059 700/119 |
| 9,302,460 | B2* | 4/2016 | Chen | ................... B29C 67/0066 |
| 2005/0056913 | A1* | 3/2005 | Farnworth | .......... B29C 67/0055 257/642 |
| 2013/0292862 | A1 | 11/2013 | Joyce | |

FOREIGN PATENT DOCUMENTS

TW     201409240     3/2014

OTHER PUBLICATIONS

"Office Action of Taiwan Counterpart Application", issued on Apr. 19, 2016, p. 1-p. 5.

* cited by examiner

*Primary Examiner* — Thukhanh T Nguyen
(74) *Attorney, Agent, or Firm* — Jianq Chyun IP Office

(57) ABSTRACT

A three-dimensional printing apparatus is provided. The three-dimensional printing apparatus includes a tank, a movable platform, a light source, a detection module, and a control unit. The tank is filled with a liquid forming material, and the movable platform is movably disposed above the tank. The light source is disposed below the tank and configured to project light on the liquid forming material so as to form a three-dimensional object layer by layer on the movable platform. The detection module is disposed above the tank and includes a signal emitter and a signal receiver. The signal emitter is configured to emit a detection signal. The control unit activates an error-detection mechanism and controls the movable platform to move toward the detection module. The control unit determines whether the three-dimensional object is abnormal based on whether the detection signal is detected by the signal receiver.

9 Claims, 6 Drawing Sheets

THREE-DIMENSIONAL PRINTING APPARATUS

CROSS-REFERENCE TO RELATED APPLICATION

This application claims the priority benefit of Taiwan application serial no. 103115345, filed on Apr. 29, 2014. The entirety of the above-mentioned patent application is hereby incorporated by reference herein and made a part of this specification.

BACKGROUND

1. Technical Field

The technical field relates to a printing apparatus, more particularly to a three-dimensional printing apparatus.

2. Description of Related Art

In recent years, with the increasing development of technology, many different methods using additive manufacturing technology such as layer by layer model building have been proposed to build physical three-dimensional (3D) models. In general, additive manufacturing technology converts a design information of a 3D model built by a software such as computer aided design (CAD) into a plurality of thin (quasi-two-dimensional) cross-sectional layers stacked continuously. At the same time, many technical means capable of forming a plurality of thin cross-sectional layers have also been gradually proposed. For instance, the printing module of a printing apparatus can generally move above the substrate along an XY-plane according to the spatial coordinates XYZ built by the design information of the 3D model, such that the building material can form a correct cross-sectional layer shape. Therefore, since the printing module moves layer by layer along an axis Z, a plurality of cross-sectional layers can be stacked layer by layer along the axis Z. As a result, the building material can form a three-dimensional object when being cured layer by layer.

Using the technique in which a three-dimensional object is formed through a photocurable building material as an example, the printing module is adapted to be immersed in a liquid forming material filled in a tank, and a light source module projects light on the liquid forming material used as the building material on the XY-plane. As a result, the liquid forming material is cured and stacked on a movable platform of the printing module. Therefore, since the movable platform of the printing module moves layer by layer along the axis Z, the liquid forming material can be cured layer by layer and stacked into a three-dimensional object. When the three-dimensional object is formed by stacking layer by layer, the three-dimensional object already formed may become damaged or broken from being in contact with the bottom portion of the tank or due to incomplete separation with the tank. Therefore, how to improve the speed and quality of three-dimensional printing is still a major issue for developers in the art.

SUMMARY

Accordingly, one of the embodiments provides a three-dimensional printing apparatus capable of detecting whether a three-dimensional object is damaged or broken during printing so as to improve the print quality of three-dimensional printing.

One of the embodiments provides a three-dimensional printing apparatus. The three-dimensional printing apparatus includes a tank, a movable platform, a light source, a detection module, and a control unit. The tank is filled with a liquid forming material, and the movable platform is movably disposed above the tank. The light source is disposed below the tank and configured to project light on the liquid forming material so as to form a three-dimensional object layer by layer on the movable platform. Moreover, the detection module is disposed above the tank. The detection module includes a signal emitter and a signal receiver, wherein the signal emitter is configured to emit a detection signal and the signal receiver is disposed on a transmission path of the detection signal. The control unit is coupled to the detection module and the movable platform, and activates an error-detection mechanism so as to control the movable platform to move toward the detection module. The control unit determines whether the three-dimensional object is abnormal based on whether the detection signal is detected by the signal receiver.

Based on the above, the three-dimensional printing apparatus of the embodiments activates the error-detection mechanism when printing the three-dimensional object so as to detect whether the three-dimensional printed object is abnormal based on whether the transmission of the detection signal is blocked by the three-dimensional object during printing. When the three-dimensional object is broken due to a collision or from being stuck on the bottom portion of the tank, the three-dimensional printing apparatus can immediately detect the three-dimensional object is abnormal and issue an alarm to the user accordingly. As a result, the user can execute further operations based on the alarm of the three-dimensional printing apparatus and prevent further printing of the three-dimensional printing apparatus under an abnormal state. Therefore, the disclosure can indeed improve the practicability of the three-dimensional printing apparatus during use and operation, and can also reduce waste of printing material, thereby lowering production costs.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments and, together with the description, serve to explain the principles of the disclosure.

DESCRIPTION OF THE EMBODIMENTS

Figure 1:
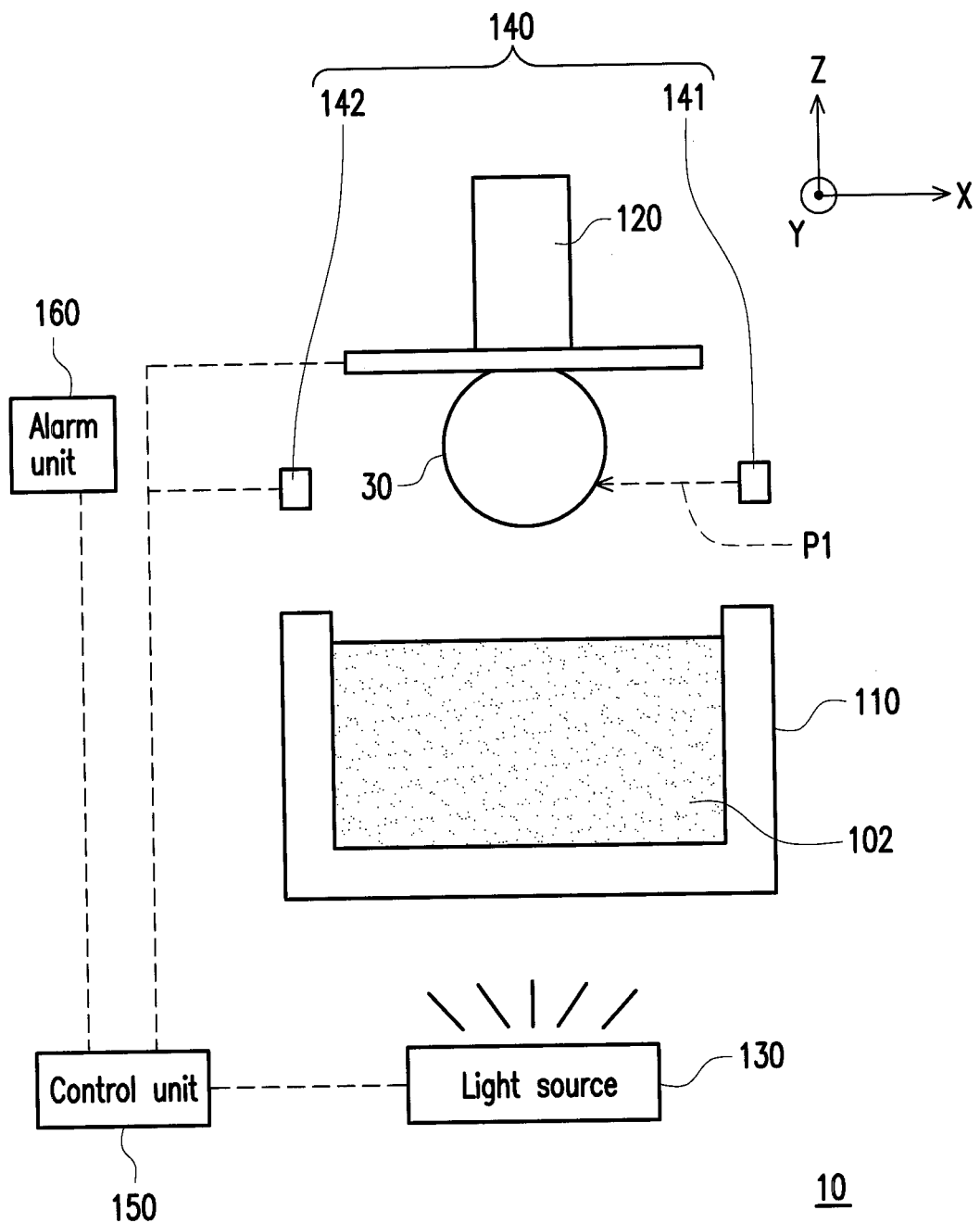
FIG. 1 is a schematic diagram of a three-dimensional printing apparatus illustrated according to one of the exemplary embodiments.

The foregoing and other technical contents, features, and effects of the disclosure are intended to be described more comprehensively in the following embodiments accompanied with figures. In the following embodiments, terms used to indicate directions such as "up", "down", "front", "back", "left", and "right", merely refer to directions in the accompanying figures. Therefore, the directional terms are used to illustrate rather than limit the disclosure. Moreover, in each embodiment below, the same or similar reference numerals are used for the same or similar elements.

FIG. 1 is a schematic diagram of a three-dimensional printing apparatus according to one of exemplary embodiments. Referring to FIG. 1, a three-dimensional printing apparatus 10 includes a tank 110, a movable platform 120, a light source 130, a detection module 140, a control unit 150, and an alarm unit 160. The Cartesian coordinate system is provided herein to describe relevant members and states of motion thereof. The tank 110 is filled with a liquid forming material 102. The movable platform 120 is movably disposed above the tank 110 and is adapted to be immersed in the liquid forming material 102. The light source 130 is disposed below the tank 110 and configured to project light on the liquid forming material 102. Since the liquid forming material 102 of the present embodiment uses a photosensitive resin or other suitable photocurable materials, the liquid forming material 102 is cured after light is projected thereon by the light source 130.

Moreover, the detection module 140 is disposed above the tank 110 and includes a signal emitter 141 and a signal receiver 142. The signal emitter 141 is configured to emit a detection signal and the signal receiver 142 is disposed on a transmission path P1 of the detection signal. The detection module 140 can be implemented as different types of detection apparatuses based on the signal transmission mode and the signal detection mode thereof. The disclosure does not limit the actual hardware structure of the detection module 140. For instance, the detection module 140 can be a light detection module and can also be an acoustic detection module. Similarly, the signal emitter 141 and the signal receiver 142 can also have different implementations based on the type of the detection module 140.

More specifically, if the detection module 140 is an acoustic detection module, then the detection signal emitted by the signal emitter 141 is an acoustic signal, and the acoustic signal is, for instance, ultrasound. In other words, if the detection module 140 is an acoustic detection module, then the signal emitter 141 is an acoustic emitter configured to emit an acoustic signal, and the signal receiver 141 is an acoustic receiver configured to detect an acoustic signal. Moreover, since the signal receiver 142 is disposed on the transmission path P1 of the acoustic signal, the signal receiver 142 can detect the acoustic signal emitted by the signal emitter 141 when the acoustic signal is not blocked by an opaque object.

Moreover, if the detection module 140 is a light detection module, then the detection signal emitted by the signal emitter 141 is a light beam. Distinguishing according to the type of the light beam emitted by the signal emitter 141, the signal emitter 141 is, for instance, a light source capable of emitting light, such as an infrared emitter, an ultraviolet emitter, or a laser emitter, and the disclosure is not limited thereto. Moreover, since the signal receiver 142 is disposed on the transmission path P1 of the light beam, the signal receiver 142 can detect the light beam emitted by the signal emitter 141 when the light beam is not blocked by an opaque object.

The control unit 150 is coupled to the movable platform 120, the light source 130, and the detection module 140, and is configured to control the movable platform 120, the light source 130, and the detection module 140. More specifically, the three-dimensional printing apparatus 10 is adapted to manufacture a three-dimensional object 30 based on a digital three-dimensional model, wherein the digital three-dimensional model can be built through, for instance, computer-aided design (CAD) or an animation modeling software so as to crosscut the digital three-dimensional model into a plurality of cross-sections. The three-dimensional printing apparatus 10 reads the digital three-dimensional model and prints the three-dimensional object 30 layer by layer based on the cross-sections of the digital three-dimensional model, and the three-dimensional object 30 is obtained after the light source 130 projects light on the liquid forming material 102 and cures the liquid forming material 102 layer by layer.

Specifically, in the present embodiment, the movable platform 120 is disposed above the tank 110 and adapted to move relative to the tank 110 along an axis, wherein the axis can be perpendicular to the liquid surface of the liquid forming material 102. For instance, as shown in FIG. 1, the movable platform 120 is adapted to move along an axis Z so as to move relatively to the tank 110 located on an XY-plane. Moreover, the movable platform 120 is adapted to be immersed in the liquid forming material 102 filled in the tank 110. In particular, the control unit 150 controls the movable platform 120 immersed in the liquid forming material 102 to move toward the direction away from the light source 130 along the axis Z so as to cure the liquid forming material 102 layer by layer. As a result, the three-dimensional object 30 is formed on the movable platform 120 with a method of layer by layer stacking.

It should be mentioned that, in the present embodiment, when the three-dimensional object 30 is formed, the control unit 150 can activate an error-detection mechanism and control the movable platform 120 to move toward the detection module 140. In other words, when the control unit 150 activates the error-detection mechanism, the control unit 150 controls the movable platform 120 to move out of the tank 110 and controls the movable platform 120 to move toward a direction close to the detection module 140. For instance, in the example shown in FIG. 1, the signal emitter 141 and the signal receiver 142 of the detection module 140 are disposed on two sides above the opening of the tank 110. Therefore, when the control unit 150 activates the error-detection mechanism, the control unit 150 controls the movable platform 120 to move out of the tank 110 along the axis Z and controls the movable platform 120 to move toward a direction close to the signal emitter 141 and the signal receiver 142 such that the three-dimensional object 30 can be located between the signal emitter 141 and the signal receiver 142 during printing.

It can be known that, if the three-dimensional object 30 is disposed on the transmission path P1 of the detection signal, then the signal receiver 142 cannot receive the detection signal emitted by the signal emitter 141 since the detection signal is blocked by the three-dimensional object 30. For instance, if the detection module 140 is a light detection module, since the opaque three-dimensional object 30 is disposed on the transmission path P1 of the light beam, the signal receiver 142 does not receive the light beam emitted by the signal emitter 141. In short, when the three-dimensional object 30 is printed, the control unit 150 decides the movement path of the movable platform 120 and thereby controls the movable platform 120 such that the three-dimensional object 30 is disposed on the transmission path P1 of the detection signal. Accordingly, the control unit 150 determines whether the three-dimensional object 30 is abnormal based on whether the detection signal emitted by the signal emitter 141 is received by the signal receiver 142. For instance, if the detection module 140 is an acoustic detection module, then the control unit 150 can determine whether the three-dimensional object 30 is abnormal based on whether an acoustic wave is detected by the signal receiver 142. It should be mentioned that, to clearly describe the embodiment, the detection module 140 is exemplified as a light detection module in the following for further description. However, those skilled in the art should be able to deduce application conditions of other types of the detection module based on the following description.

Figure 2:
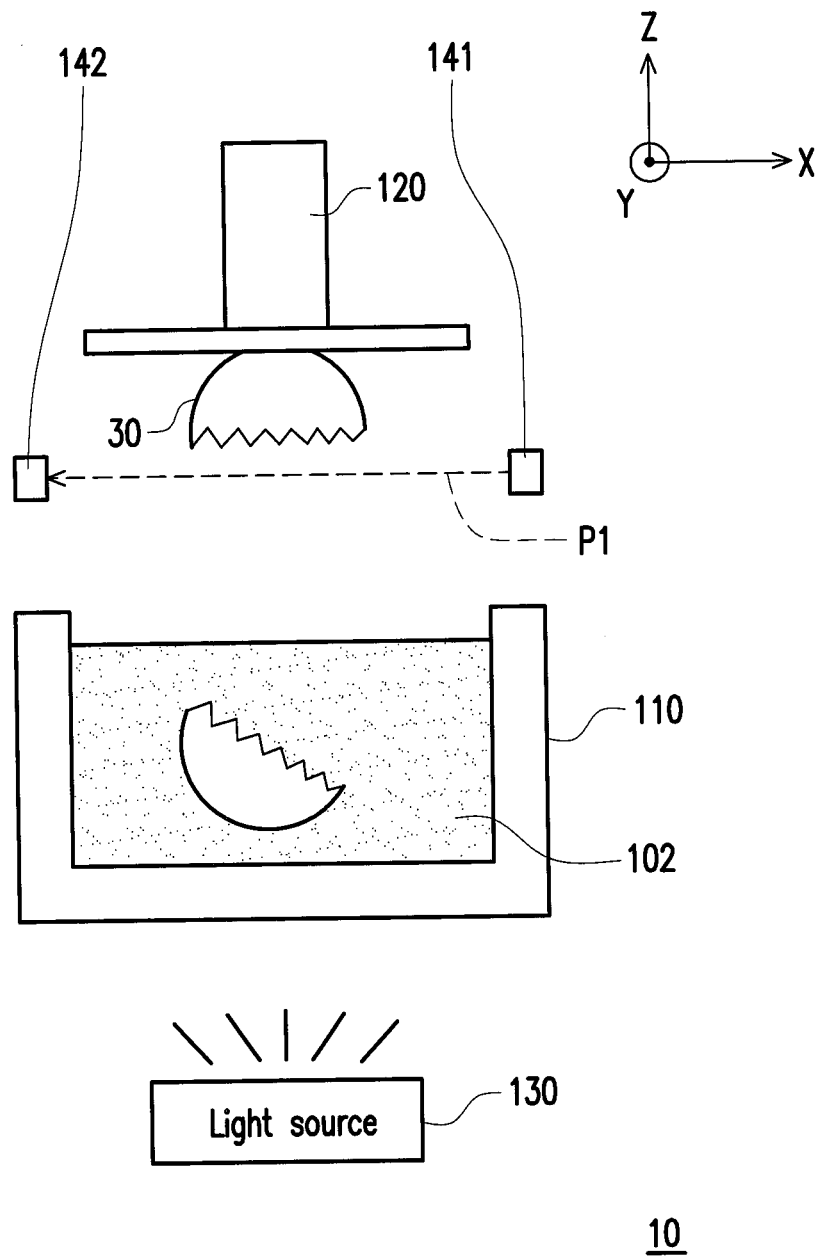
FIG. 2 is a schematic diagram of a three-dimensional object under an abnormal state illustrated according to one of the exemplary embodiments.

FIG. 2 is a schematic diagram of a three-dimensional object under an abnormal state illustrated according to one of exemplary embodiments. Referring to both FIG. 1 and FIG. 2, when the three-dimensional object 30 is not abnormal, the three-dimensional object 30 blocks the light beam emitted by the signal emitter 141, and therefore the signal receiver 142 does not detect the light beam emitted by the signal emitter 141. In contrast, when the three-dimensional object 30 is broken, the light beam that should originally be blocked by the three-dimensional object 30 is transmitted to the signal receiver 142 through the transmission path P1. In other words, since the signal receiver 142 detects the light beam emitted by the signal emitter 141 when the signal receiver 142 should not be receiving the light beam, the control unit 150 can detect that the three-dimensional object 30 is broken or abnormal accordingly.

In the present embodiment, once the control unit 150 determines the three-dimensional object 30 is abnormal or broken, the control unit 150 can control the alarm unit 160 to issue an alarm such as one of an indicating text, a sound, and a lamplight, or a combination thereof, so as to warn the user that the three-dimensional printing apparatus 10 has a printing error. Moreover, in another embodiment, when the control unit 150 determines the three-dimensional object 30 is abnormal or broken, the control unit 150 can also directly terminate the printing process of printing the three-dimensional object 30 so as to prevent further printing of the three-dimensional printing apparatus under an error state.

It should be mentioned that, although FIG. 1 and FIG. 2 are exemplified by one group of the signal emitter and the signal receiver, the disclosure does not limit the quantity of the signal emitter and the signal receiver, and the design can be made according to actual application conditions. Moreover, the implementation of the disclosure can be different based on the disposition method (fixed or movable) of each of the signal emitter and the signal receiver, and can be decided according to actual application conditions and requirements. For instance, in an embodiment, the signal emitter and the signal receiver of the detection module can be fixedly disposed above the tank. In another embodiment, the signal emitter and the signal receiver of the detection module can also be disposed on a moving component such that the signal emitter and the signal receiver move above the tank through the moving component. In the following, the above two disposition methods are respectively described with examples to further describe the embodiments clearly.

Figure 3:
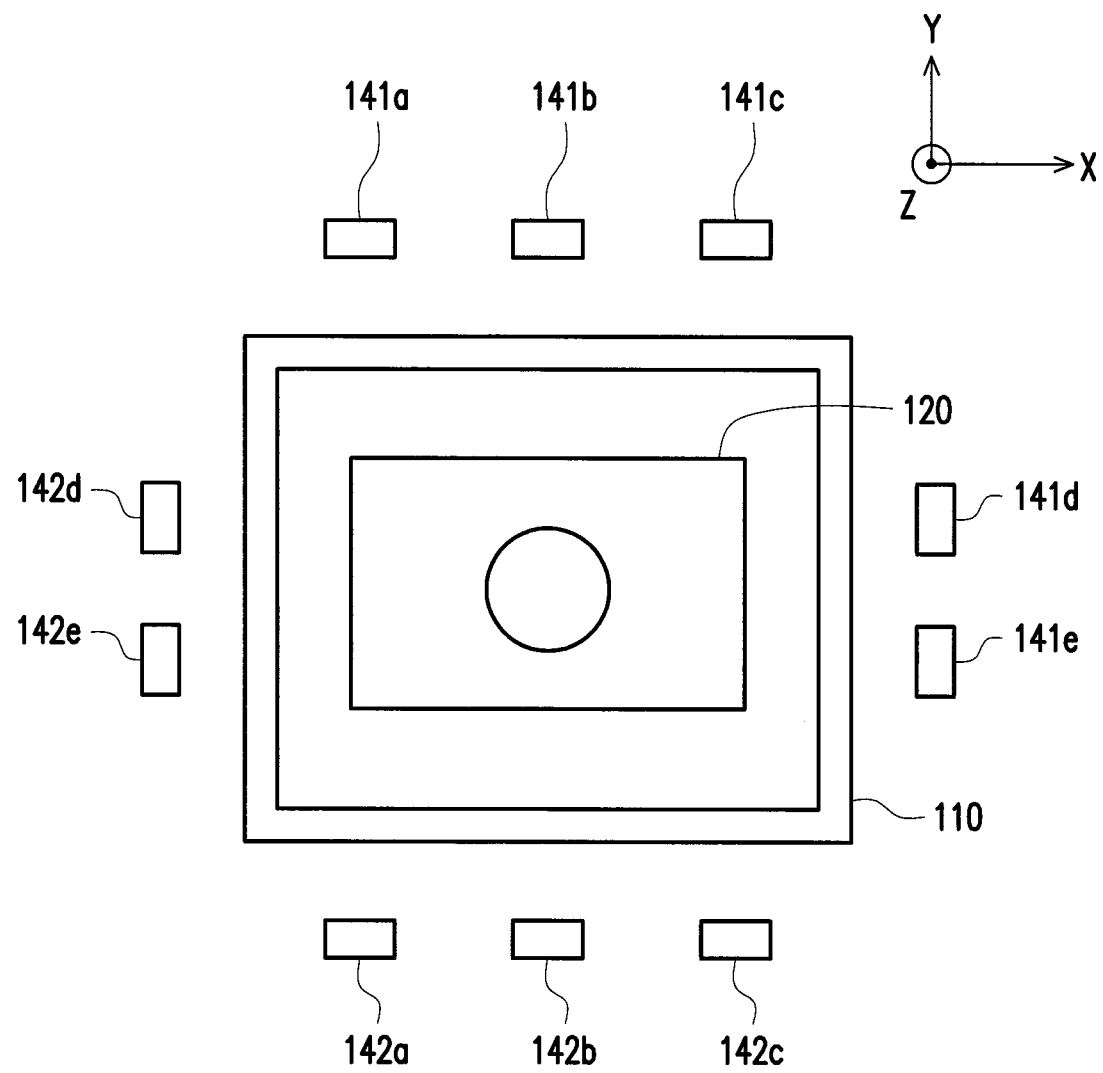
FIG. 3 is a partial top view schematic of a three-dimensional printing apparatus illustrated according to one of the exemplary embodiments.

FIG. 3 is a partial top view schematic of a three-dimensional printing apparatus illustrated according to one of exemplary embodiments. Referring to FIG. 3, in the present example, the detection module 140 is located above the tank 110. The detection module 140 includes five signal emitters which are respectively a signal emitter 141a, a signal emitter 141b, a signal emitter 141c, a signal emitter 141d, and a signal emitter 141e. In contrast, the detection module 140 includes five signal receivers which are respectively a signal receiver 142a, a signal receiver 142b, a signal receiver 142c, a signal receiver 142d, and a signal receiver 142e. The signal emitters 141a to 141e are each located on a detection location thereof so as to emit a light beam. Moreover, the detection locations of the signal emitters 141a to 141e are default locations decided in advance, and the signal receivers 142a to 142e are respectively configured to receive the light beam emitted by each of the signal emitters 141a to 141e.

As shown in FIG. 3, in the present exemplary embodiment, the signal receiver 142a is configured to detect the light beam emitted by the signal emitter 141a and the signal receiver 142b is configured to detect the light beam emitted by the signal emitter 141b. Similarly, the signal receiver 142e is configured to detect the light beam emitted by the signal emitter 141e. Accordingly, during the three-dimensional printing, when the control unit 150 activates the error-detection mechanism, the movable platform 120 is moved out of the tank 110 and moves to a certain height along the axis Z such that the three-dimensional object can be disposed between the signal receivers 142a to 142e and the signal emitters 141a to 141e during printing.

Accordingly, if one of the signal receivers 142a to 142e does not detect the light beam, then the detection signal is blocked by the three-dimensional object during printing, and the control unit 150 determines the three-dimensional object is not abnormal. On the other hand, if the signal receivers 142a to 142e all detect the respective light beams, then the control unit 150 determines the three-dimensional object is abnormal during printing. It should be mentioned that, in the fixed detection module of the present exemplary embodiment, the higher the quantity of the signal emitter and the signal receiver or the higher the disposition density, the higher the accuracy of detecting whether the three-dimensional object of the present embodiment is abnormal.

Figure 4A:
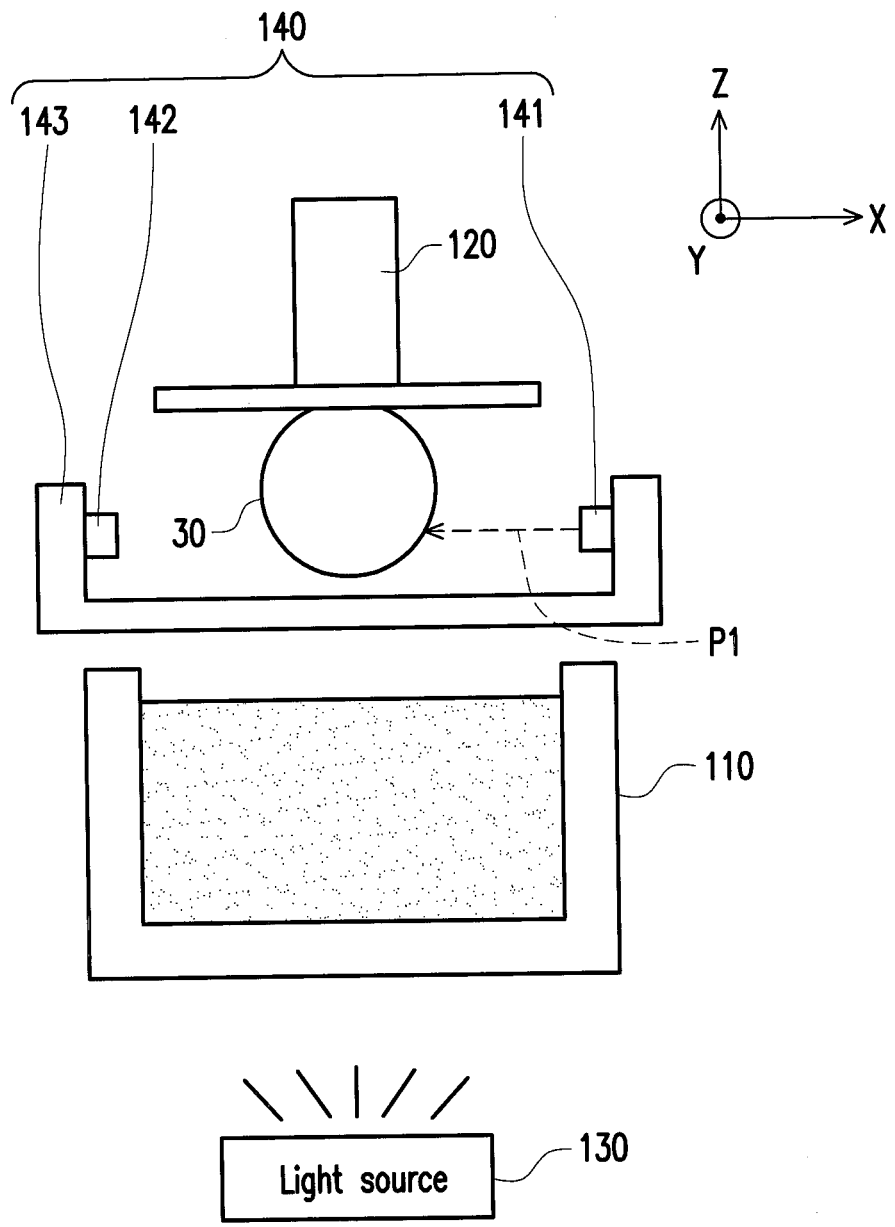
FIG. 4A is a partial front view schematic of a three-dimensional printing apparatus illustrated according to one of the exemplary embodiments.
Figure 4B:
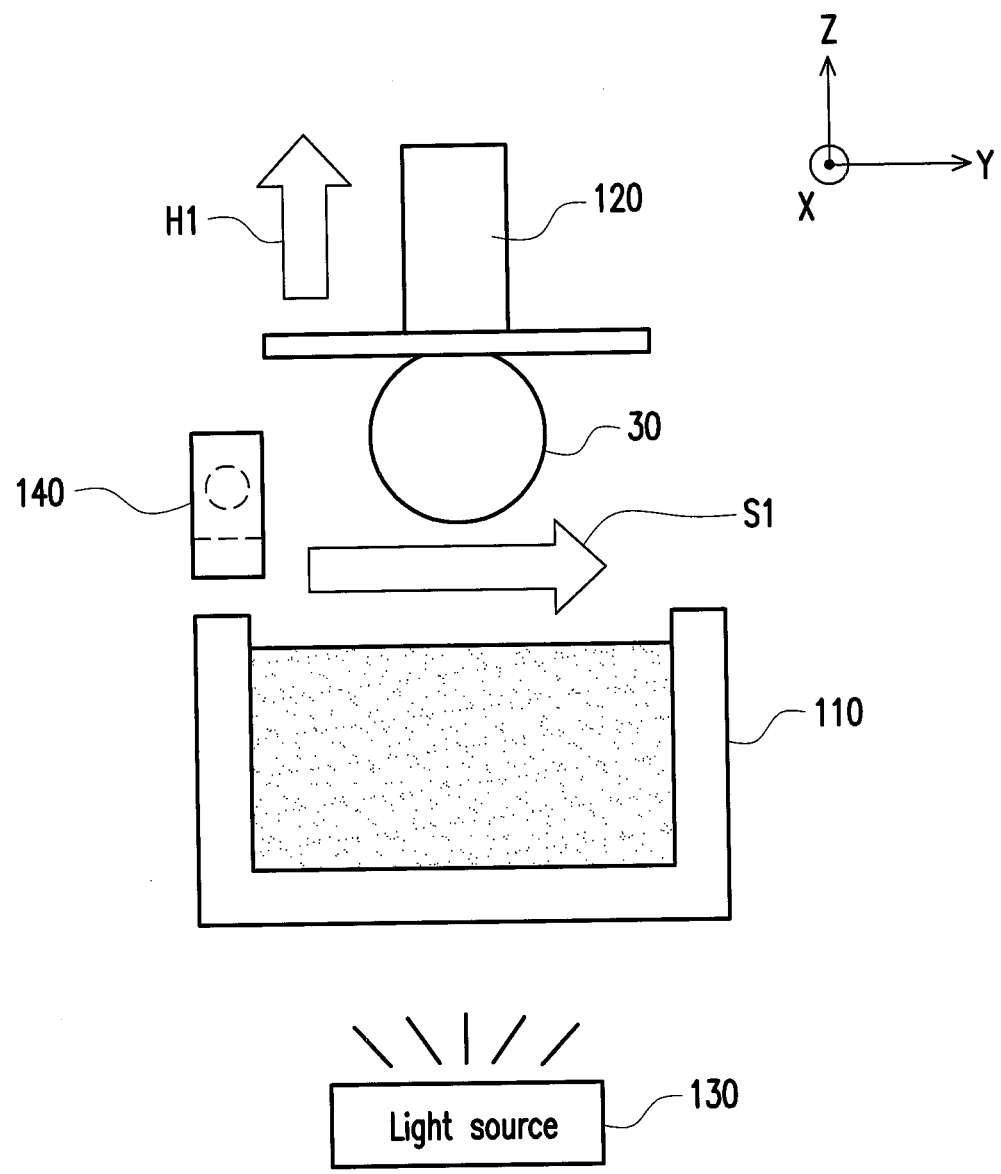
FIG. 4B is a partial side view schematic of a three-dimensional printing apparatus illustrated according to one of the exemplary embodiments.

Moreover, FIG. 4A is a partial front view schematic of a three-dimensional printing apparatus illustrated according to one of exemplary embodiments. FIG. 4B is a partial side view schematic of a three-dimensional printing apparatus illustrated according to one of exemplary embodiments. Referring to both FIG. 4A and FIG. 4B, in the present exemplary embodiment, the detection module 140 is movably disposed above the tank 110. In addition to the signal emitter 141 and the signal receiver 142, the detection module 140 includes a moving component 143. The signal emitter 141 and the signal receiver 142 are disposed on the moving component 143. As shown in FIG. 4A, the signal emitter 141 is disposed on one end of the moving component 143 and the signal receiver 142 is disposed on another end of the moving component 143. Similarly, to make the signal receiver 142 detect the light beam emitted by the signal emitter 141; the signal receiver 142 is disposed on the transmission path P1 of the light beam emitted by the signal emitter 141.

In the present exemplary embodiment, when the three-dimensional object 30 is printed, the control unit 150 can activate the error-detection mechanism so as to move the movable platform 120 toward the detection module 140. In the present exemplary embodiment, when the control unit 150 activates the error-detection mechanism, the control unit 150 controls the movable platform 120 to move along a moving direction H1 (axis Z) such that the three-dimensional object 30 can be moved to above the moving component 143 during printing and the three-dimensional object 30 can be located between the signal emitter 141 and the signal receiver 142 during printing.

Based on the above, after the control unit 150 controls the movable platform 120 to move toward the detection module 140 from inside the tank 110, the control unit 150 further controls the moving component 143 to move toward a scanning direction S1. In the present exemplary embodiment, the control unit 150 further controls the moving component 143 to move to another side above the tank 110 from one side above the opening of the tank 110 along the scanning direction S1 (axis Y). Specifically, the moving component 143 moves toward the scanning direction S1 during a detection period such that the light beam emitted by the signal emitter 141 can perform a complete scanning operation on the XY-plane where the moving component 143 is located based on the displacement on the axis Y.

If the three-dimensional object 30 is broken, then the three-dimensional object 30 does not block the light beam emitted by the signal emitter 141, and therefore the signal receiver 142 can detect the light beam emitted by the signal emitter 141 during the detection period without interruption. In other words, if the signal receiver 142 continuously detects the light beam without interruption during the detection period, then the control unit 150 determines the three-dimensional object 30 is abnormal. On the other hand, if the signal receiver 142 does not continuously detect the light beam during the detection period, then a portion of the light beam emitted by the signal emitter 141 is shielded by the three-dimensional object 30, and the control unit 150 determines that the three-dimensional object 30 is not abnormal or broken.

It should be mentioned that, the above embodiments do not limit the time point at which the control unit 150 activates the error-detection mechanism. However, in an embodiment, the control unit 150 can decide whether to activate the error-detection mechanism based on a specific activation condition. Specifically, the control unit 150 can determine whether a printing parameter satisfies the activation condition of activating the error-detection mechanism and thereby decide whether to activate the error-detection mechanism detecting whether the three-dimensional object is abnormal. That is, when the printing parameter satisfies the activation condition, the control unit 150 activates the error-detection mechanism detecting whether the three-dimensional object is abnormal accordingly.

The printing parameter can be the thickness information or the print duration of the three-dimensional object, and can also represent a parameter of various print conditions, and the disclosure is not limited thereto. For instance, during three-dimensional printing, the control unit 150 can activate the error-detection mechanism at fixed intervals. Alternatively, every time the cumulative thickness of the three-dimensional object stacked layer by layer on the movable platform 120 reaches a default value (such as 3 cm), the control unit 150 activates the error-detection mechanism. In other words, the selection and the activation condition of the printing parameter can be decided based on actual application conditions.

Figure 5:
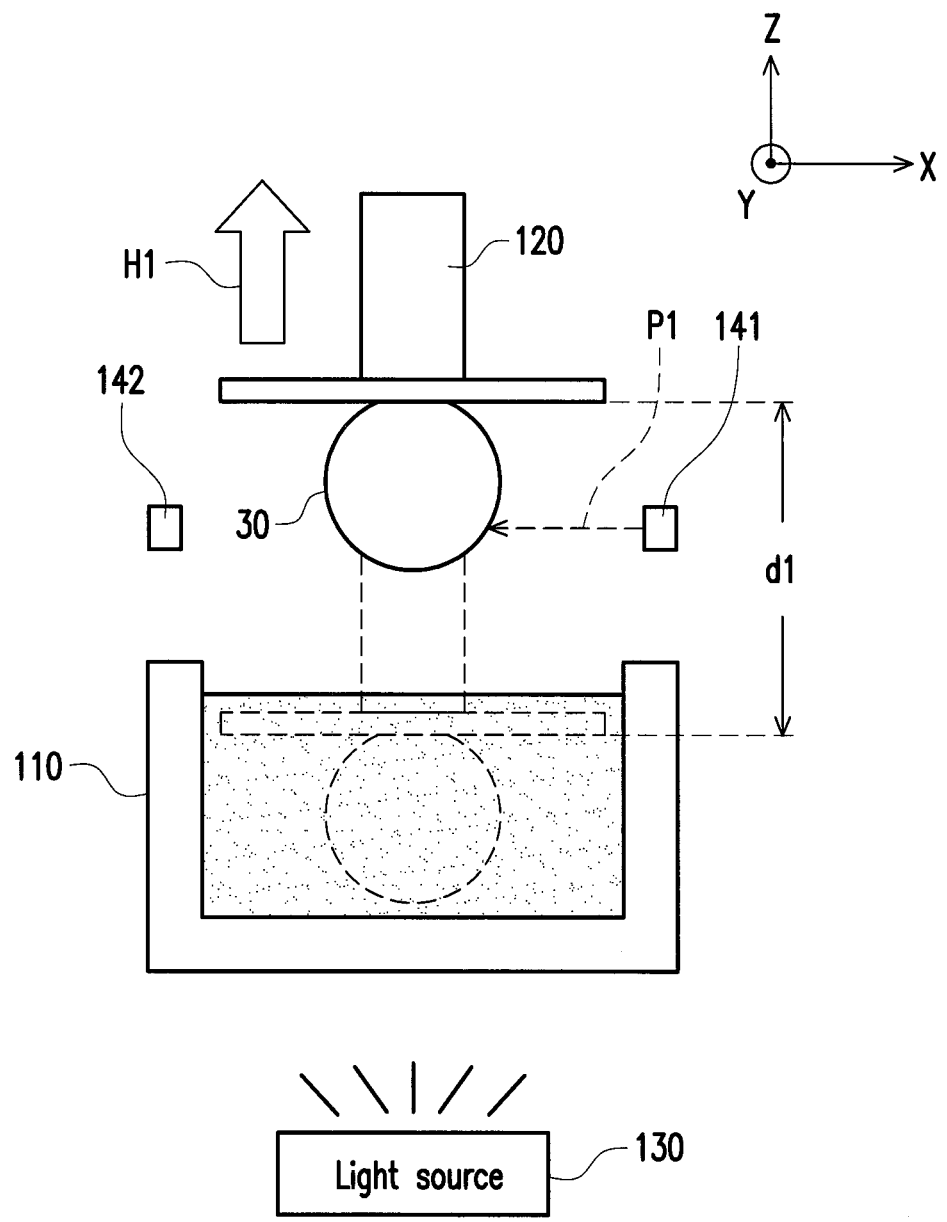
FIG. 5 is an exemplary schematic of moving a movable platform illustrated according to one of the exemplary embodiments.

It should be mentioned that, the control unit 150 can further decide the moving method of the movable platform 120 based on the above printing parameter. Specifically, FIG. 5 is an exemplary schematic of moving a movable platform illustrated according to one of exemplary embodiments. It should be mentioned first that, in the present example, it is assumed that the printing parameter configured to activate the error-detection mechanism is the cumulative thickness parameter of the three-dimensional object 30. In particular, the cumulative thickness parameter increases as the three-dimensional object 30 is stacked on the movable platform 120 layer by layer. Every time the cumulative thickness parameter is equal to the default value, the control unit 150 activates the error-detection mechanism and resets the cumulative thickness parameter to zero.

Once the control unit 150 activates the error-detection mechanism, the control unit 150 controls the movable platform 120 to move toward the detection module 140 from inside the tank 110 along the direction H1 (axis Z), wherein the axis Z is perpendicular to the liquid surface of the liquid forming material 102. Moreover, the control unit 150 can decide a moving height dl of the movable platform 120 on the axis Z based on the printing parameter. Specifically, in the present example, since the activation condition of the error-detection mechanism is that the cumulative thickness parameter is equal to the default value, the control unit 150 can decide the moving height dl of the movable platform 120 on the axis Z based on the current cumulative thickness parameter. As a result, the signal emitter 141 and the signal receiver 142 can perform detection on an undetected portion on the three-dimensional object 30 or a portion on the three-dimensional object 30 that is just formed. For instance, the control unit 150 can control the moving height dl of the movable platform 120 on the axis Z such that the light beam emitted by the signal emitter 141 during every detection period is projected on a specific location close to the bottom portion of the three-dimensional object 30.

Based on the above, in the above embodiments of the disclosure, the three-dimensional printing apparatus can activate the error-detection mechanism when printing the three-dimensional object. When the three-dimensional printing apparatus activates the error-detection mechanism, the three-dimensional object is located on the transmission path of the detection signal of the detection module during printing through the movement of the printing platform. Accordingly, the three-dimensional printing apparatus can immediately detect whether the three-dimensional object is abnormal or broken based on whether the detection signal is detected by the signal receiver. When the three-dimensional apparatus detects the three-dimensional object is abnormal, the three-dimensional apparatus issues an alarm to the user or directly terminates the printing process accordingly. As a result, further printing of the three-dimensional printing apparatus under an abnormal state can be prevented. Therefore, waste of three-dimensional printing material and waste of time are reduced, and the print quality of the three-dimensional printing apparatus is thereby improved.

Although the disclosure has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A three-dimensional printing apparatus, comprising:
   a tank filled with a liquid forming material;
   a movable platform movably disposed above the tank;
   a light source disposed below the tank and configured to project light on the liquid forming material so as to form a three-dimensional object layer by layer on the movable platform;
   a detection module disposed above the tank and comprising a signal emitter and a signal receiver, wherein the signal emitter is configured to emit a detection signal and the signal receiver is disposed on a transmission path of the detection signal; and
   a control unit coupled to the detection module and the movable platform, wherein the control unit activates an error-detection mechanism so as to control the movable platform to move toward the detection module, and determines whether the three-dimensional object is abnormal based on whether the detection signal is detected by the signal receiver.

2. The three-dimensional printing apparatus of claim 1, wherein the detection module comprises a moving component, the signal emitter and the signal receiver are disposed on the moving component, and the control unit controls the moving component to move toward a scanning direction after the control unit controls the movable platform to move toward the detection module.

3. The three-dimensional printing apparatus of claim 2, wherein the moving component moves toward the scanning direction during a detection period, and if the signal receiver continuously detects the detection signal during the detection period, then the control unit determines the three-dimensional object is abnormal.

4. The three-dimensional printing apparatus of claim 3, wherein the moving component moves toward the scanning direction during a detection period, and if the signal receiver does not continuously detect the detection signal during the detection period, then the control unit determines the three-dimensional object is not abnormal.

5. The three-dimensional printing apparatus of claim 1, wherein the signal emitter emits the detection signal on a detection location, and if the signal receiver detects the detection signal, then the control unit determines the three-dimensional object is abnormal, and if the signal receiver does not detect the detection signal, then the control unit determines the three-dimensional object is not abnormal.

6. The three-dimensional printing apparatus of claim 5, wherein the detection location of the signal emitter is a default location.

7. The three-dimensional printing apparatus of claim 1, wherein the control unit determines whether a printing parameter satisfies an activation condition, and when the printing parameter satisfies the activation condition, the control unit activates the error-detection mechanism.

8. The three-dimensional printing apparatus of claim 7, wherein when the error-detection mechanism is activated, the control unit controls the movable platform to move toward the detection module along an axis, wherein the axis is perpendicular to a surface of the liquid forming material, and the control unit decides a moving height of the movable platform on the axis based on the printing parameter.

9. The three-dimensional printing apparatus of claim 1, further comprising an alarm unit, wherein if the control unit determines the three-dimensional object is abnormal, then the control unit controls the alarm unit to issue an alarm.

\* \* \* \* \*